United States Patent [19]

Sasaki et al.

[11] Patent Number: 4,546,230
[45] Date of Patent: Oct. 8, 1985

[54] WELDING PROCESS USING LASER BEAM

[75] Inventors: Hiroaki Sasaki, Yotsukaido; Noboru Nishiyama, Ichihara; Akio Kamada, Chiba, all of Japan

[73] Assignee: Kawasaki Steel Corporation, Hyogo, Japan

[21] Appl. No.: 537,454

[22] PCT Filed: Jan. 7, 1983

[86] PCT No.: PCT/JP83/00004
§ 371 Date: Sep. 8, 1983
§ 102(e) Date: Sep. 8, 1983

[87] PCT Pub. No.: WO83/02414
PCT Pub. Date: Jul. 21, 1983

[30] Foreign Application Priority Data

Jan. 8, 1982 [JP] Japan ................................ 57-1057

[51] Int. Cl.$^4$ .............................................. B23K 26/00
[52] U.S. Cl. ........................ 219/121 LD; 219/121 LC
[58] Field of Search ............... 219/121 LC, 121 LD, 219/121 EC, 121 ED, 121 LP, 121 LR

[56] References Cited

FOREIGN PATENT DOCUMENTS

| 0037054 | 3/1976 | Japan | 219/121 LD |
| 0029243 | 3/1978 | Japan | 219/121 ED |
| 0066841 | 6/1978 | Japan | 219/121 ED |
| 0008178 | 4/1979 | Japan | 219/121 LD |

*Primary Examiner*—C. L. Albritton
*Attorney, Agent, or Firm*—Sughrue, Mion, Zinn, Macpeak & Seas

[57] ABSTRACT

A welding process using a laser beam for joining metals such as steel plates along a see-through groove 10 such as a square groove formed by laser welding between opposed edges of the two metals is disclosed, in which a filler wire 9 is supplied to the see-through groove 10 as shown in FIGS. 3*a*, 3*b* and 4 to increase the permissible gap of the see-through groove. A spot 11 of laser beam 1 with a power density of $5 \times 10^5$ w/cm$^2$ or above is formed in the see-through groove 10 on the same level as the surface of the metals 3. The filler wire 9 is inserted into a point coincident with the spot 11 of the laser beam 1, or the spot 11 of the laser beam 1 is formed on top of the filler wire 9 in the see-through groove 10. As the filler wire 9 is melted by the laser beam, a globule or droplet formed is formed from it and proceeds to and deposited on the opposed edge faces 12 defining the groove 10 to heat the edges 12 to effect welding.

5 Claims, 9 Drawing Figures

WELDING PROCESS USING LASER BEAM

TECHNICAL FIELD

This invention relates to a welding process using a laser beam and, more particularly, to a welding process using a laser beam for joining metals such as steel plates along a see-through groove such as a square groove formed between opposed edges of the metals without use of any backing strip but by supplying a filler wire, in which the filler wire is inserted into the groove to apoint therein coincident with the focused spot of the laser beam so that the globule or droplet produced from the filler wire properly proceeds to the opposed edge faces of metals defining the groove, thereby improving the permissible gap of the groove and increasing the welding speed.

BACKGROUND TECHNIQUES

The welding process using a laser beam generally is a high speed, low heat input and high efficiency welding process as is well known in the art. In this welding process, the permissible gap of the groove is very small because a very high positioning precision is required.

In the laser beam welding, a laser beam is converged through a lens or like optical system, and its intensified energy density spot is used as a heat source for the welding. A weld bead of high bead shape index (i.e., depth of penetration divided by width of bead) thus can be obtained with a low heat input. For this reason, the laser welding is extensively utilized in applications where thermal deformation due to the welding heat input is undesired. However, since a spot of a laser beam converged by a lens or like optical system is used as the source of heat, the permissible gap of the groove is very small, and the edge preparation and butt of metals to be joined require high precision.

Usually, the permissible groove gap is 15 20% of the thickness of metals to be joined, and when joining welding coils in a steel process line or like case where the weld line is long, it is difficult to maintain the groove gap within the permissible value. By way of example, when joining cold rolled steel plates with a thickness of 1 mm by welding, the permissible groove gap is approximately 0.1 mm. When a cold rolled steel plate is cut to a length of 1 m or more using an ordinary shearing machine, the cut edge is liable to have at least locally curved portions. If it is intended to join such steel plates by square groove butt welding, the groove gap is liable to exceed 0.2 mm. In such a case, local failure of deposition of the weld bead is liable when the metal pieces are joined by the laser welding, thus spoiling the soundness of the joint.

Various measures have been proposed for the purpose of increasing the permissible value of the groove gap. These proposed measures, however all have problems in the operability. In addition, the groove gap is rather increased to deteriorate the features of the laser welding, while the permissible groove gap is not improved so much.

As an example, U.S. Pat. No. 4,167,662 discloses a welding process, in which an electric arc is produced between an electrode and a heat-affected zone (hereinafter referred to as HAZ) including the weld zone produced by a laser beam directed to the metals to be joined. More specifically, as shown in FIG. 1, a laser beam 1 generated from a laser (not shown) is converged by a lens 2 so that it is focused at a point 4 on metals 3 to be joined, thus forming a HAZ at the point 4 of focus. An electric arc is produced between an electrode 5 and the HAZ. Reaction gas, e.g., oxygen, is jet from a nozzle 7 toward the point 4. The metals 3 are joined by this welding process. In this welding process, as the electrode 5 may be used those employed for the TIG welding or MIG welding. In addition, the heat source that is constituted by the laser beam may be augmented by the heat of the electric arc and further by the reaction heat of the oxygen jet, if desired. The permissible groove gap thus can be increased. On the demerit side, however, the welding heat input is inevitably increased, which is undesired from the standpoint of the low heat input welding, a primary feature of the laser welding.

FIG. 2 shows a set-up of a different proposal. In this case, a filler wire is used for multi-layer build-up welding using a high power laser of an output power of 4-KW or above to join metals 3 arranged to define a single Vee groove 8.

The groove in this set-up is not a see-through groove such as a square groove but a single Vee groove, and the filler wire is supplied for the purpose of adjusting the composition of the deposited metal only. That is, the filler wire is not supplied as a means of increasing the permissible value of the gap of a see-through groove such as a square groove.

In order to overcome the deficiencies discussed above, the inventors have conducted extensive research and investigations.

It is confirmed that the status of formation of the globule or droplet varies with the speed of feeding of the filler wire. For example, where a 2-KW $CO_2$ laser beam is focused through a lens with a focal distance of 75 mm onto a filler wire with a diameter of 0.9 mm, only a giant globule is formed from the filler wire when the wire is fed at a speed of 0.6 m/min, whereas with a wire feed speed of 1.4 m/min or above there occurs spattering of a droplet from the wire tip as soon as it is formed.

The invention is predicated in the findings mentioned, and it seeks to provide a welding process using a laser beam for joining metals such as steel pieces along a see-through groove such as a square groove formed between opposed edges of the metals without use of any backing strip but by supplying a filler wire, in which the filler wire is inserted into the groove to a point therein coincident with the focused spot of the laser beam so that the globule or droplet produced from the filler wire properly proceeds to the opposed edge faces of metals defining the groove, thereby improving the permissible gap of the groove.

DISCLOSURE OF THE INVENTION

Namely, a first feature of the invention resides in a process of butt welding using a laser beam for joining mating metals by converging the laser beam toward a see-through groove formed between opposed edges of the two metals without use of any backing strip. The metals thus can be welded efficiently with a low heat input. Especially, the process is suited for the welding of steel plate coils in a steel processing line.

A second feature of the invention resides in a welding process using a laser beam, in which the filler wire is supplied into the see-through groove and melted by a laser beam spot formed thereon with a power density of $5 \times 10^5$ w/cm$^2$ or above. The permissible groove gap thus can be greatly improved. Also, the process is readily applicable to the welding of steel plate coils in a steel processing line. Further, the depth of penetration is not sacrified at all, while the composition of the molten metal is adjustable. Thus, the process is applicable to the welding of metals which produce fragile inter-metal compounds.

A third feature of the invention resides in a welding process using a laser beam, in which the permissible gap of the see-through groove is adequately set in relation to the thickness of metals to be joined and the diameter of the filler wire and the groove gap is set within the permissible groove gap. Thus, sound weld bead can be readily formed at a high welding speed.

DESCRIPTION OF THE PREFERRED EMBODIMENTS

Figure 1:
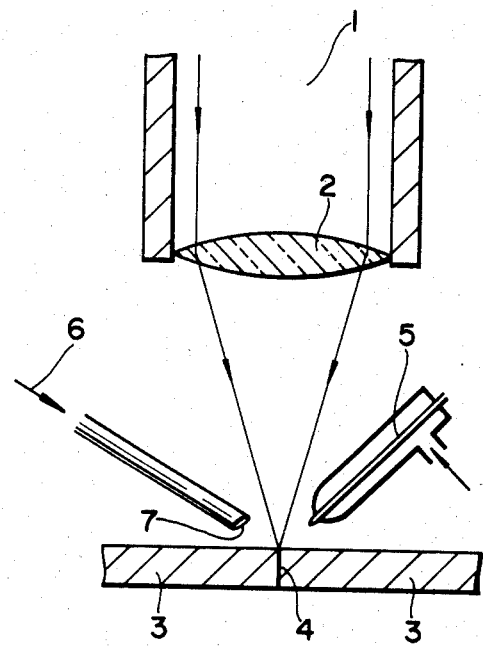
FIG. 1 is a schematic fragmentary sectional view showing a prior art laser welder.
Figure 2:
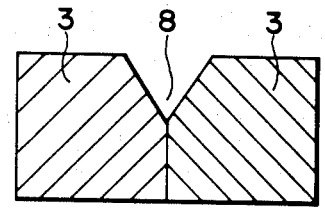
FIG. 2 is a fragmentary sectional view showing a prior art welding groove.
Figure 3A:
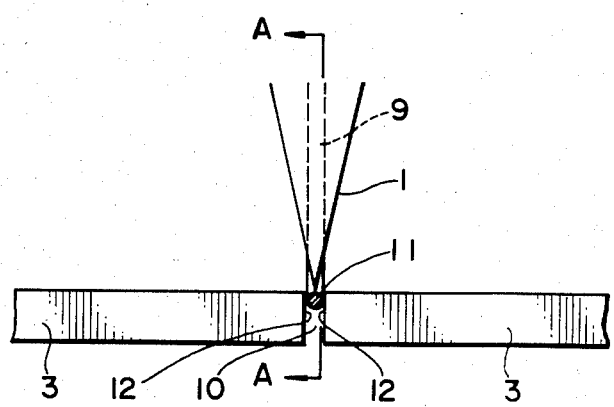
FIG. 3a is a view showing a set-up for see-through groove butt welding of steel plates according to the invention.
Figure 4:
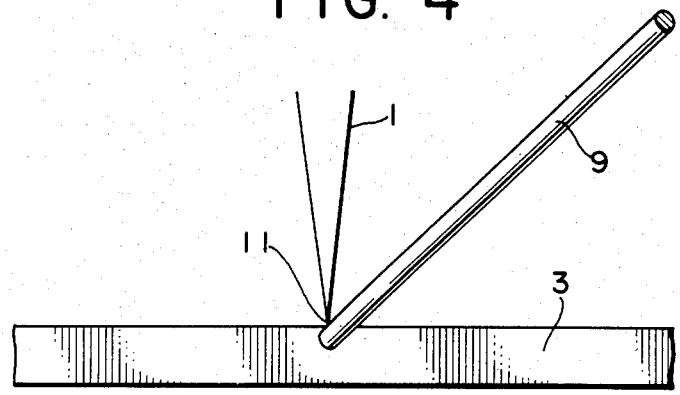
FIG. 4 is a view taken along line A—A in FIG. 3.

Referring now to FIGS. 3a and 4, two metal pieces 3 to be joined are arranged with a see-through groove 10 such as a square groove formed between their opposed edges. A filler wire 9 is supplied into the groove 10, and is progressively molten by a converged spot 11 of a laser beam 1. The converged spot 11 of laser beam means a zone thereof where the power density is $5 \times 10^5$ w/cm$^2$ or above. The filler wire 9 is molten by the converged laser beam spot, and the molten metal or globule or droplet formed from the filler wire 9 in the groove 10 proceeds therein to be deposited on and joining the two metal pieces 3. The laser beam 1 is converged through a lens system as is well known in the art. The process according to the invention is based on the observation of the behavior of the globule produced from the filler wire 9. More specifically, the globule forms a bridge in the see-through groove. The bridge thus formed melts the opposed edges of metal pieces defining the groove 10, whereby a weld bead is formed. In order to be able to form a satisfactory weld bead, the gap of the groove and the diameter of the filler wire 9 should be as follows.

Firstly, in the case where the metal pieces 3 to be joined by butt welding along the see-through groove 10 such as square groove formed there between without use of any backing strip have a thickness less than the diameter of the filler wire 9, the gap of the groove 10 is set in a range between 0.1 mm and the value corresponding to the diameter of the filler wire 9.

Secondly, in the case where the metal pieces 3 have a large thickness in excess of the diameter of the filler wire 9, the gap is set in a range between 0.1 mm and the value corresponding to double the diameter of the filler wire 9.

In either of these two cases, the welding is done using the laser beam 1 with the power density of $5 \times 10^5$ w/cm$^2$ or above, i.e., by converting the laser beam 1 such that its converged spot 11 formed on the surface of the filler wire 9 has the power density noted during the welding.

The reason for doing so is as follows.

Figure 5:
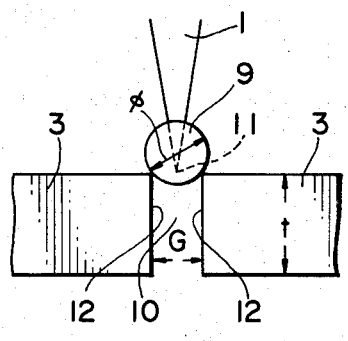
FIG. 5 is a view showing an example of the positional relation between filler wire and focused laser beam spot in a groove in the welding process according to the invention.

In the first-mentioned case and a certain circumstance of the second-mentioned case, the gap G of the groove 10 is smaller than the diameter of the filler wire 9 as shown in FIG. 5. In this case, filler wire 10 does not entirely enter the groove 10 but is held by the upper ends of the opposed edges of the two metal pieces 3. In this situation, a globule or droplet is formed as the filler wire 9 is molten by the laser beam 1 with the converged spot 11 thereof at the surface level of the metal pieces 3 irrespective of whether the thickness t thereof is smaller or greater than the diameter of the filler wire 9. This droplet forms a bridge in the groove 10 by short circuit transfer or splash transfer. A satisfactory weld bead is formed in this way.

Figure 6:
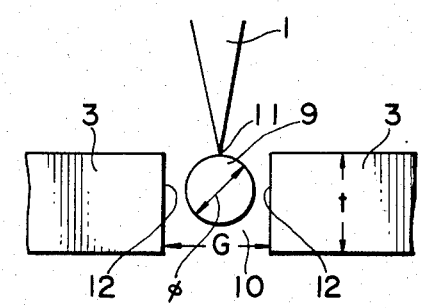
FIG. 6 is a view showing another example of the positional relation between filler wire and focused laser beam spot in a groove in the welding process according to the invention.

In the second case mentioned, it may happen that the gap G of the groove 10 is greater than the diameter of the filler wire 9. In this case, the filler wire 9 can be received in the groove 10 and spaced apart from the edge faces thereof. Here, if the thickness t of the metal pieces 3 is less than the diameter of the filler wire 9, the formation of a droplet at the filler wire tip and subsequent short circuit transfer or splash transfer with an adequate filler wire feed speed do take place in a lower portion of the groove, and the droplet fails to be deposited on the opposite edge faces 12 of the groove. In this case weld bead can not be obtained. If the thickness t of the metal pieces 3 is greater than the diameter of the filler wire 9, a droplet that is formed as the filler wire 9 is supplied to the converged spot 11 of the laser beam at the level of the surface of the metal pieces 3 as shown in FIG. 6, proceeds towards the opposite edge faces 12 so that a bridge is formed. In this case, a satisfactory weld bead is formed even if the gap G of the groove 10 is as large as double the diameter of the filler wire 9. The permissible value of the groove gap G thus can be greatly increased or improved to permit extension of the scope of application of the welding process using a laser beam.

By way of comparison, where steel plates 3.5 mm in thickness are joined by square groove butt welding using a 2-KW laser beam, without supply of any filler wire the permissible groove gap is approximately 0.25 mm and the maximum speed of the full penetration welding is 0.7 m/min. With the filler wire supplied according to the invention, the permissible groove gap can be increased up to 1.8 mm and the maximum welding speed is increased to 1.1 m/min. That is, not only the permissible groove gap is greatly increased, but the welding speed is greatly improved owing to the increased permissible groove gap.

A presumed reason for the fact that the permissible groove gap is suddenly changed with respect to a certain value of the metal piece thickness, i.e., a value corresponding to the filler wire diameter, in the laser welding with the supply of filler wire is as follows.

Where the groove gap G is greater than the filler wire diameter, with a thickness of metal pieces less than the filler wire diameter the progress of the droplet at the filler wire tip by short circuit transfer or splash transfer takes place in a lower portion of the groove. Therefore, it is difficult to obtain deposition of the droplet to the opposite edge faces of the groove and hence the formation a bead. On the other hand, with a metal piece thickness in excess of the filler wire diameter the deposition of the droplet on the opposite edge faces can be readily obtained. The phenomenon of sudden change of the permissible groove gap depending on the thickness of the metal pieces to be joined does not depend on the filler wire diameter, and this is confirmed to be true in a filler wire diameter range from 0.6 to 1.6 mm. Extensive experiments conducted prove that where the filler wire diameter is 0.9 mm, the permissible groove gap is approximately 1 mm with a metal piece thickness of 0.5 mm whereas it is greatly increased to 1.6 mm with a metal piece thickness increase to 1 mm. Where the metal piece thickness and filler wire diameter are substantially equal, the adequate permissible groove gap from the standpoint of safety as well is substantially equal to the filler wire diameter. The minimum groove gap is set to 0.1 mm, because a gap less than this lower limit would hardly permit gap adjustment and also reduce the welding speed necessary for a given depth of penetration compared to the case of the groove gap of 0.1 mm. The setting of the maximum permissible groove gap to double the filler wire diameter is based on the experimentally confirmed fact that the droplet formed at the tip of the filler wire 9 has a diameter substantially equal to double the filler wire diameter and, at the most, three times the filler wire diameter even if the splash progress is taken into considerations.

Figure 7:
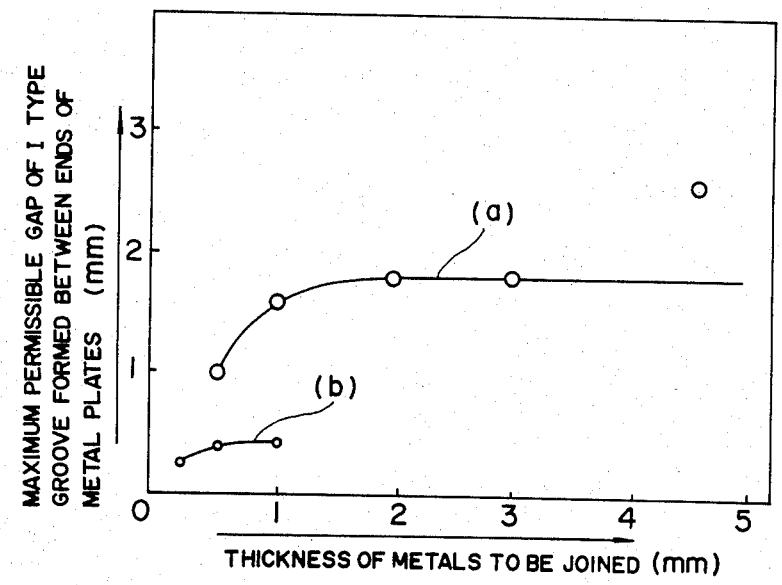
FIG. 7 is a graph the relationship among the filler wire diameter, maximum permissible groove gap and thickness of metals to be joined according to the invention.

FIG. 7 shows the relation between the maximum permissible groove gap and thickness of the metal pieces to be joined with the filler wire diameter taken as a third parameter. A plot (a) in FIG. 7 is obtained with a filler wire diameter of 0.9 mm, and a plot (b) with a filler wire diameter of 0.2 mm. As is obvious from the graph of FIG. 7, the welding of metal pieces is difficult unless the thickness thereof is 0.2 mm or above. The lower limit of the thickness of metal pieces is set to 0.2 mm, because if the thickness is less than 0.2 mm the welding is difficult in case of a groove gap of 0.1 mm.

Where the filler wire is inserted into the groove gap, it is desirable that the point of its insertion in the groove gap coincide with the converged spot of the laser beam, that is, the laser beam should coincide with the surface of the filler wire. The power density of the laser beam reduces as the point of insertion of the filler wire in the groove gap is separated from the focused spot of the laser beam. In such a case, the power density of approximately $5 \times 10^5$ w/cm² cannot be obtained on the filler wire surface so that the intended melting of the filler wire can no longer be obtained. Besides, since according to the invention the permissible groove gap is increased, a slight sidewise deviation of the filler wire insertion point from the focused laser beam spot would result in the failure of incidence of the laser beam on the filler wire or failure of melting of the filler wire even if a beam spot is formed thereon.

Further, the laser beam is preferably focused in the groove in the plane of the surface of the metal pieces to be joined. In the cases of FIGS. 5 and 6, the laser beam 1 is focused at a point 11 on the top of the groove 10, i.e., on the plane of the surface of the opposite side metal pieces 3. This arrangement permits improvement of the permissible groove gap without sacrifice in the maximum welding speed, that is, it is possible to make the utmost use of the advantages of the supply of filler wire. Separation of the focused spot of the laser beam from the level of the metal piece surface reduces the permissible groove gap for a given welding speed, that is, it greatly reduces the advantage of the filler wire supply.

Where the thickness of metal pieces to be joined is greater than the filler wire diameter, there is no need of focusing the laser beam in the groove on the plane of the metal piece surface. In this case, the laser beam spot may be formed on the filler wire surface disposed below the top of the groove. Doing so is suitable in case of the multi-layer build-up welding where satisfactory Uranami beads can be formed without use of any backing strip.

Figure 3B:
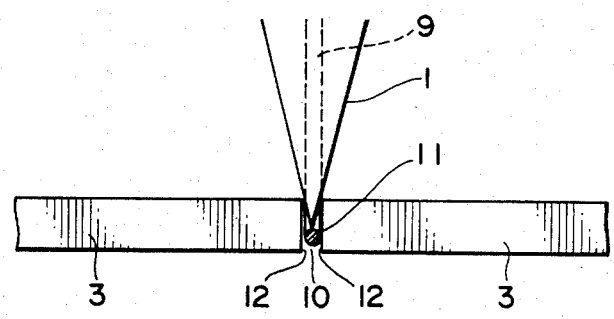
FIG. 3b is a view showing a set-up for multi-layer build-up butt welding of steel plates according to the invention.

According to the invention, as shown in FIG. 3b, metal pieces 3 having a thickness greater than the diameter of the filler wire 9 are joined by converging a laser beam 1 toward a groove 10 formed between the two metal pieces 3, the filler wire 9 being supplied into the groove 10, without use of any backing strip. The gap of the groove is set in a range between a value corresponding to the filler wire diameter and a value corresponding to double the filler wire diameter. A converged spot of the laser beam 1 with a power density of $5 \times 10^5$ w/cm² or above is formed on the filler wire top 9 to melt the filler wire and effect welding along the see-through groove.

Even in this welding process, the filler wire in the groove is molten to form a droplet, which proceeds and is deposited on the opposed edge faces 12 of the groove to form a bridge, i.e., a first weld bead layer. For the formation of this first weld bead layer, the upper limit of the permissible groove gap and the positional relation between the filler wire top and focused laser beam spot are important. The upper limit of the permissible groove gap is set to correspond to double the filler wire diameter because the diameter of the droplet formed at the filler wire tip is substantially double the filler wire diameter.

After the formation of the first bead layer, i.e., for the formation of the second and further bead layers, the conditions noted above need not be strictly satisfied so long as the filler wire is molten and necessary portions of the edge faces of the groove are heated satisfactorily.

While the foregoing description was concerned with laser welding applied to the joining of steel plates or like steel materials, the invention is generally applicable to metals based on iron and also to other metals suited for laser welding.

Examples of the invention will now be given.

EXAMPLE 1

Steel plates 1 mm in thickness arranged with a square groove formed between their opposed edges were joined by laser welding using a 2-KW $CO_2$ laser beam while supplying a filler wire 0.9 mm in diameter. The laser beam spot was formed in the square groove on the level of the steel plate surface. The filler wire was fed at a rate of 1.4 m/min during welding. Weld free from any defect could be obtained at a welding speed of 2 m/min up to a groove gap of 0.5 mm. In contrast laser welding conducted under the same conditions but without use of any filler wire, weld free form defect could be obtained only up to a groove gap of 0.2 mm, showing a great improvement of the permissible groove gap according to the invention.

EXAMPLE 2

Figure 8:
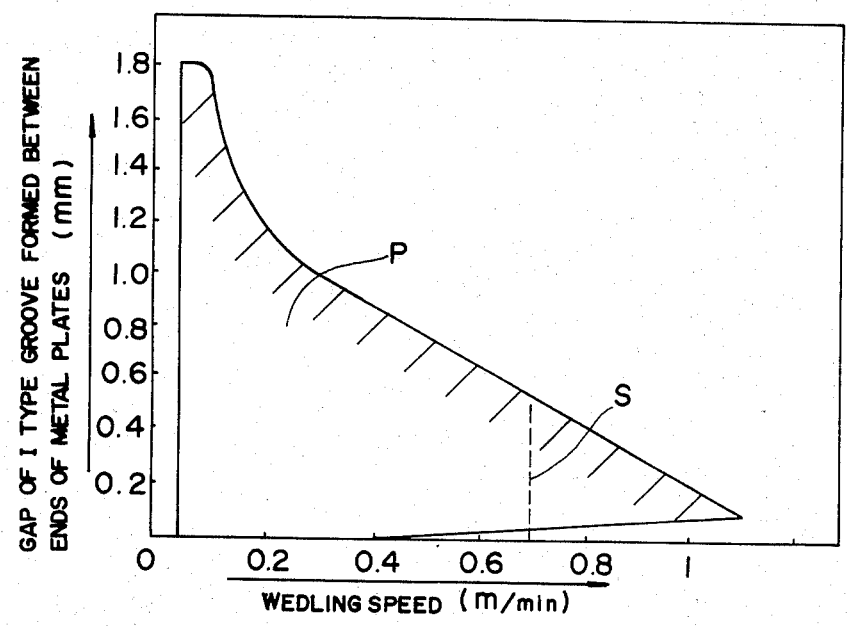
FIG. 8 is a graph showing the relationship among the welding speed, groove gap and weld bead formation zone according to the invention.

Square groove laser welding was done to join steel plates 3.5 mm in thickness under the same conditions for the rest as in Example 1. FIG. 8 shows the relation between the groove gap and welding speed obtained in this example of welding. In the Figure, indicated at P is a bead formation region, and at S the maximum welding speed obtained without use of any filler wire. The Figure indicates that where there is no groove gap the welding speed is greatly reduced by the use of the filler wire and also that where the groove gap is in excess of double the filler wire diameter the bead formation is unsatisfactory.

EXAMPLE 3

Metal plates 0.5 mm in thickness were joined by laser welding using a 1.5-KW $CO_2$ laser beam while supplying a low alloy steel filler wire 0.9 mm in diameter. The maximum permissible groove gap was 1 mm under at a filler wire feed rate of 1.4 m/min and a welding speed of 1.2 m/min.

EXAMPLE 4

Metal plates 4.6 mm in thickness were joined by laser welding using a 1.5-KW $CO_2$ laser beam while supplying a low alloy steel filler wire 0.9 mm in diameter. A bead could be formed, although somewhat unsatisfactory, even with a groove cap of 2.2 mm at a filler wire feed rate of 1.5 m/min and a welding speed of 0.2 m/min.

EXAMPLE 5

Metal plates 1 mm in thickness were joined by laser welding using a 1.5-KW $CO_2$ laser beam while supplying a low alloy steel filler wire 0.9 mm in diameter. A satisfactory bead could be obtained at a filler wire feed rate of 1.5 m/min, with a groove gap of 1 mm and at a welding speed of 1 m/min.

EXAMPLE 6

Metal plates 5 mm in thickness were joined by laser welding using a 5-KW $CO_2$ laser beam while supplying a low alloy steel filler wire 1.6 mm in diameter. A satisfactory bead could be obtained even with a groove gap of 3.5 mm at a filler wire feed rate of 2 m/min and a welding speed of 0.2 m/min.

EXAMPLE 7

Metal plates 2 mm in thickness were joined by laser welding using a 2-KW $CO_2$ laser beam while supplying a high alloy steel filler wire 0.6 mm in diameter. A satisfactory bead could be obtained with a groove gap of 0.3 mm at a filler wire feed rate of 4 m/min and a welding speed of 2 m/min.

EXAMPLE 8

Steel plates 2 mm in thickness were joined by laser welding using a 2-KW $CO_2$ laser beam while supplying a low alloy steel filler wire 0.6 mm in diameter. A satisfactory bead could be obtained with a groove gap of 1.2 mm at a filler wire feed rate of 4 m/min and a welding speed of 40 cm/min.

EXAMPLE 9

Steel plates 2 mm in thickness were joined by laser welding using a 2-KW $CO_2$ laser beam while supplying a low alloy steel filler wire 0.6 mm in diameter. A satisfactory bead could not be obtained although a bridge was formed in the groove with a groove gap of 1.5 mm at a filler wire feed rate of 4 m/min and a welding speed of 30 cm/min.

EXAMPLE 10

SUS 430 steel plates 4.6 mm in thickness were joined by Uranami laser welding using a 1.5-KW $CO_2$ laser beam while supplying a low alloy steel filler wire 0.9 mm in diameter. The groove gap was set to 1.8 mm, and no backing strip was used. The filler wire was set in the groove at a position of 2 mm from the back surface of the steel plates. The laser beam spot was formed on top of the filler wire. A satisfactory bead Uranami could be obtained at a filler wire feed rate of 1 m/min and a welding speed of 20 cm/min. Multi-layer build-up welding was done under the same conditions, and the welding was completed with the third bead layer.

EXAMPLE 11

Steel plates 0.2 mm in thickness were joined by laser welding using a 500-W laser beam while supplying a low alloy steel filler wire 0.2 mm in diameter. A satisfactory joint could be obtained with a groove cap of 0.1 mm at a filler wire feed rate of 5 m/min and a welding speed of 5 m/min.

EXAMPLE 12

Steel plates 0.15 mm in diameter were joined using a 500-W laser beam while supplying a low alloy steel filler wire 0.2 mm in diameter. Weld bead could not be obtained at a filler wire feed rate of 5 m/min and a welding speed of 5 m/min. Also a weld bead could not be obtained even by varying the welding speed, filler wire feed rate and laser output power.

EXAMPLE 13

Steel plates 0.2 mm in thickness were joined using a 500-W laser beam while supplying a low alloy steel filler wire 0.1 mm in diameter. The welding was unsatisfactory with a groove gap of 0.1 mm at a filler wire feed rate of 10 m/min and a welding speed of 5 m/min.

POSSIBILITIES OF INDUSTRIAL APPLICATIONS

As has been described in detail, according to the invention, mating metal pieces are joined by converging a laser beam toward a see-through groove formed between opposed edges of the two metal pieces without use of any backing strip but with a filler wire supplied to the see-through groove and the gap thereof set in a range between 0.1 mm and a value equal to double the diameter of the filler wire. Thus, in comparison with the prior art of laser welding without supply of any filler wire, in the present invention. A remarkable increase of the permissible groove gap can be obtained and an increase of the maximum full penetration speed can be achieved, thus permitting reduction of the equipment and increased operation efficiency.

Further effects obtainable with the welding process according to the invention are as follows. (1) Thick metals can be welded with a comparatively low output power laser welder. (2) Heat input to the metals to be joined can be reduced, so that the heat-affected zone formed during welding is small. The process is thus suited to weld joints of thick materials such as stainless steel based on ferrite where growth of crystal grains in the heat-affected zone is undesired. (3) The rate of dilution of the molten metal by the metals to be joined as well as the heat input thereto can be controlled according to the temperature of the globule or droplet obtained from the filler wire.

Further, since the rate of dilution of the molten metal can be readily controlled, the process is applicable to the welding of metals, which produce fragile intermetal components, by suitably selecting the composition of the filler wire.

We claim:

1. A welding process using a laser beam for joining mating metal pieces by converging the laser beam toward a see-through groove formed between opposed butting edges of the two metal pieces without use of any backing strip, wherein a filler wire is continuously supplied into said see-through groove, the gap of said see-through groove being in a range between 0.1 mm and double the diameter of the filler wire, and a converged spot of the laser beam is only on the filler wire to effect welding along said see-through groove.

2. A welding process using a laser beam according to claim 1, wherein said converged spot of the laser beam has a power density of $5 \times 10^5$ w/cm$^2$.

3. A welding process using a laser beam according to claim 1, wherein the two metal pieces arranged to form the see-through groove between their opposed edges have a thickness in a range from 0.2 mm to a value equal to the diameter of said filler wire, the gap of said see-through groove is in a range from 0.1 mm to a value equal to the diameter of said filler wire, said laser beam is converged to form a focused spot in said see-through groove on the level of the surface of said metal pieces, and said filler wire is supplied to said focused spot of the laser beam.

4. The welding process using a laser beam according to claim 1, wherein the two metal pieces arranged to form the see-through groove between their opposed edges have a thickness greater than the diameter of said filler wire, the gap of said see-through groove is in a range from 0.1 mm to a value equal to double the diameter of said filler wire, said laser beam is converged to form a focused spot in said see-through groove on the level of the surface of said metal piece, and said filler is supplied to said focused spot of the laser beam.

5. The welding process using a laser beam according to claim 1, wherein the two metal pieces arranged to form the see-through groove between their opposed edges have a thickness greater than the diameter of said filler wire, the gap of said see-through groove is in a range from a value equal to the diameter of said filler wire to a value equal to double the diameter of said filler wire, and said converged spot of the laser beam is formed on top of said filler wire in said see-through groove to thereby melt said filler wire.

* * * * *